United States Patent [19]

Sayles

[11] Patent Number: 4,943,610

[45] Date of Patent: Jul. 24, 1990

[54] NON-SHRINKING, DIMENSIONALLY-STABLE MODIFIED EPOXY RESINS

[76] Inventor: David C. Sayles, P.O. Box 4741, Huntsville, Ala. 35815

[21] Appl. No.: 173,604

[22] Filed: Nov. 30, 1987

[51] Int. Cl.$^5$ .................... C08G 59/40; C08G 59/62
[52] U.S. Cl. .................................. 525/415; 525/447; 528/110; 528/116; 528/297; 528/354
[58] Field of Search ............... 528/110, 116, 190, 361, 528/365, 354; 525/415, 447

[56] References Cited

U.S. PATENT DOCUMENTS

| | | | |
|---|---|---|---|
| 3,294,743 | 12/1966 | Mack | 528/116 |
| 3,352,804 | 11/1967 | Harrison et al. | 528/110 X |
| 3,382,210 | 5/1968 | Wyart et al. | 528/116 X |
| 3,759,954 | 9/1973 | Batzer et al. | 528/365 X |
| 4,368,314 | 1/1983 | Endo et al. | 528/110 X |
| 4,387,215 | 6/1983 | Bailey | 528/354 |
| 4,492,789 | 1/1985 | Nakashima et al. | 528/116 X |
| 4,515,912 | 5/1985 | Sayles | 523/456 |
| 4,574,132 | 3/1986 | Sayles | 523/466 |

*Primary Examiner*—Earl Nielsen

[57] ABSTRACT

A non-shrinking, strain-free, dimensionally-stable modified epoxy resin is disclosed for use in the fabrication of composite, structural laminates. The uniqueness of product preparation is that the optimum amount of the lactone compound can be copolymerized with the epoxy resin since equimolar amounts of each monomer do not necessarily need to be copolymerized to achieve the optimum shrink resistance. By varying the ratio of shrink-resistant monomer and epoxy in a resin blend, a means is available for controlling the shrinkage, and, in this manner, it would be possible to produce a laminate with a matrix so tailored so that reinforcing fibers would not undergo breakage, or pull out of the matrix on being stressed. The modified epoxy resin is the reaction product produced from reacting a compound selected from 6-hexanolactone and 5-norbornene-2,2-dimethanol with the diglycidyl ether of bisphenol A and cured with the curing agent hexahydrophthalic acid. The ratio of the modified-epoxy composition to epoxy can be varied to achieve the desired volume change or desired shrinkage control in the matrix resin when used in a lamination process which employs fibers selected from glass, graphite and poly-p-ethylene terephthalamide as required for high brust strength pressure uses.

2 Claims, No Drawings

NON-SHRINKING, DIMENSIONALLY-STABLE MODIFIED EPOXY RESINS

DEDICATORY CLAUSE

The invention described herein may be manufactured, used, and licensed by or for the Government for governmental purposes without the payment to me of any royalties thereon.

BACKGROUND OF THE INVENTION

Filament-reinforced resin motor cases have been and are being extensively used in the propulsion industry. Several advantages have resulted from employment of filament-reinforced-resin motor cases. Some of the advantages include: light weight-reinforced resin motor case, the ease of manufacture, storage, transportation, and insensitivity against sparking or electrical conductance malfunctions.

Advanced interceptor motor case technology has placed additional requirements on the propulsion industry to ensure that these motor cases withstand the stresses due to the high acceleration forces resulting from employing ultrahigh burning rate propellants and kill vehicle control systems which require high maneuverability to execute difficult tactical maneuvers. It is well established that the strength of a motor case is weakened at points of stresses due to material weaknesses or inadequacies of the fabrication techniques. For filament-reinforced composite motor cases, particularly, those that include a curable resin which undergo shrinkage on polymerization, stress due to shrinkage of the resin causes an inherent defect during the manufacture of the motor case.

Laminated structures for other uses which also employ filament-reinforced resin composites are subjected to the same stress factors as a result of shrinkage on polymerization of the resin. Such shrinkage can produce defects in the fiber portion since the fibers, if subjected to excessive stress due to resin shrinkage, can undergo breakage or be weakened to below their design strength values.

A bisspiroortho carbonate, 3, 9-bis(5'-norbornene-2'-yl)-1,5,7,11-tetraoxaspiro [5.5]undecane is disclosed in applicant's U.S. Pat. No. 4,515,912, filed July 5, 1984, for use in cure shrink-resistant missile motor cases. All epoxy resin blends normally employed in filament-reinforced composite motor cases undergo shrinkage on polymerization. This shrinkage causes an inherent defect due to the stress which develops in the manufacture of the motor case.

The modified epoxy resin blend disclosed in U.S. Pat. No. 4,515,912 is comprised of a first component mixture of diglycidyl ether of bisphenol A (EPON 828) 50 parts and epoxidized Dimer acid (EPON 871) 50 parts; a second component of butanediol diglycidyl ether 25 parts; and a three component mixture of TONOX 60/40 (20 parts) which is comprised of 65% 4,4'-diaminodiphenylmethane, 10% triamines, and 25% polyamines. The TONOX 60/40 (20 parts) is replaced with 20 parts of a third component of the curative o-phenylenediamine-boron trifluoride etherate, and to the above parts of ingredients excluding TONOX 60/40 is added about 15 parts of a fourth component of the bisspiroorthocarbonate, 3,9-bis(5'-norbornene-2'yl)-1,5,7,11-tetraoxaspiro [5.5]undecane. The modified resin is a resin which expands during curing rather than shrinks during curing whereby the inherent stress normally formed from shrinkage during curing is elimiated or substantially reduced.

The technology of expandable adhesives has been one of major interest because these adhesives produce bonds from an adhesive matrix that are substantially void-free and stress-free.

Applicant's U.S. Pat. No. 4,574,132, filed Nov. 9, 1984, discloses the general purpose expandable adhesive comprised of a spiroortho ester synthesized from the lactone, 6-caprolactone, and the diglycidyl ethers of bisphenol A and 1,4-butanediol, Cab-o-Sil, silica (325 mesh) thickener/thixotrope, and Unirez 2800, amidoamino curing agent, has superior tensile strength, superior bondability and with less void formation to aluminum, steel, wood, and cured concrete as compared with a general purpose adhesive which does not contain a spiroortho ester.

For tailoring the optimum shrink characteristics of a copolymerized product of a compound selected from 6-hesanolactone and 5-norborne-2,2-dimethanol with a compound having an oxiranyl (epoxy) group, it is desirable to produce a laminate in which the reinforcing fibers will not undergo breakage, or pull out of the matrix.

Therefore, an object of this invention is to provide a product wherein a predetermined amount of the reaction product of a compound selected from 6-hexanolactone and 5-norbornene-2,2-dimethanol and an epoxy compound is cured with a predetermined amount of a curing agent to achieve optimum shrink resistance in the modified epoxy resin employed in the fabrication of composite, structural laminates, such as: interceptor motor cases, propellant binders, aerospace structures, prestressed precision castings, high strength adhesives, potting compounds, etc.

SUMMARY OF THE INVENTION

The reaction product produced from reacting a compound selected from 6-hexanolactone and 5-norbornene-2,2-dimethanol with the diglycidyl ether of Bisphenol A is cured with the curing agent hexahydrophthalic acid to yield an optimum shrink-resistant generic spiro-epoxy composition which is subsequently tailored to predetermined specifications by varying the ratio of reaction product and an additional amount of unmodified epoxy resin.

The reaction of product formed from reaction 6-hexanolactone and diglycidyl ether of Bisphenol A of about 100 parts is cured with hexahydrophthalic acid of about 40 parts at 150° C. for about two hours. The resulting modified epoxy resin showed a volume change of only 10% of the volume change of a control which was cured with diglycidyl ether of Bisphenol A. The other mechanical properties included a no change in the elongation percent with a decrease of tensile strength, shore hardness glass transition temperature, and specific gravity. The adhesive properties (e.g., tensile and peel strengths aluminum-to-aluminum) showed a ten fold increase for the reaction product as compared with a control of the cured diglycidyl ether of Bisphenol A. Increased values were obtained for iron-to-iron peel strength and shear strength for the reaction product as compared with a control of the cured diglycidyl ether of Bisphenol A.

DESCRIPTION OF THE PREFERRED EMBODIMENT

The reaction product produced from reacting a compound selected from 6-hexanolactone and 5-norbornene-2,2-dimethanol with the diglycidyl ether of Bisphenol A yields a modified epoxy resin which is subsequently blended with an unmodified epoxy resin and cured with the curing agent hexahydrophthalic acid to provide a shrink-resistant composition useful in laminated fiber-reinforced structures.

The compounds used in this disclosure have the following structures:

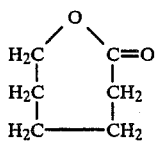

6-HEXANOLACTONE

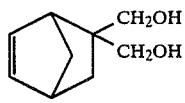

5-NORBORNENE-2,2-DIMETHANOL

The reaction of 6-hexanolactone and diglycidyl ether of Bisphenol A is depicted as follows:

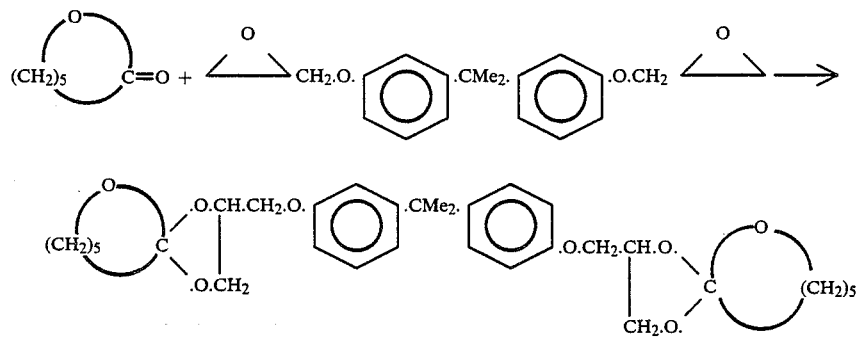

The above reaction product (6-hexanolactone-DGEBA), which is an expandable product of 6-hexanolactone and diglycidyl ether of Bisphenol A, was evaluated by measuring the mechanical and adhesive properties of the expandable product and unmodified diglycidyl ether of Bisphenol A (DGEBA). Table I below depicts the compared values of the mechanical and adhesive properties.

TABLE I

COMPARISON OF THE PROPERTIES OF THE EXPANDABLE-, AND UNMODIFIED DIGLYCIDYL ETHER OF BISPHENOL A

| PROPERTIES | 6-HEXANOLACTONE-DGEBA | DGEBA |
|---|---|---|
| Mechanical Properties* | | |
| Tensile Strength (Kg/cm$^2$)/(psi) | 600/8,532 | 800/11,376 |
| Elongation (%) | 5 | 5 |
| Shore Hardness | D-81 | D-87 |
| Glass Transition | 64 | 167 |
| Temperature (°C.) | | |
| Specific Gravity (25° C.) | 1.212 | 1.227 |
| Volume Change on Polymerization % | 0.03 | 0.30 |
| Adhesive Properties* | | |
| Tensile Peel strength (Kg/cm) | | |
| Aluminum-to-Aluminum | 7.62 | 0.76 |
| Iron-to-Iron | 3.30 | 1.02 |
| Tensile Shear strength (Kg/cm) | | |
| Iron-to-Iron | 270 | 180 |
| Decomposition Temperature (°C.) as measured by Differential Scanning Calorimeter (Heating Rate = 10° C./min | 383 | 370 |

*Curing Conditions = 150° C. for 2 hr.

Three replicate samples were cast into aluminum cups, and deaerated for one hour in a vacuum desiccator. The percentage of volume changes which occurred after curing, are summarized in Table II. The samples were cured at 375° F. for 2½ hours. All volume measurements were taken at room temperature.

TABLE II

PERCENTAGE VOLUME CHANGE WHICH OCCURRED WITH MODIFIED AND UNMODIFIED EPOXY RESINS

| | SPECIMEN | | |
|---|---|---|---|
| MONOMER | A(EXP) | B(EXP) | C(CONTROL) |
| MODIFIED EPOXY + EPOXY (1:1) | −2.4 | | |
| MODIFIED EPOXY + EPOXY (2:1) | | −1.4 | |
| DGEBA | | | −7.1 |

In reference to Table II, the percentage volume change which takes place in the modified-epoxy reaction product in a ratio of 1:1 with the unmodified epoxy (specimen A) compared with specimen C (control) indicates a substantial reduction in shrinkage. In considering specimen B and specimen C, the modified-epoxy reaction product in a ratio of 2:1 with the unmodified epoxy shows even less percentage shrinkage.

These comparisons illustrate an effective means of controlling the amount of shrinkage that will take place.

Thus, employing a modified-epoxy can yield a laminate of optimum characteristics. By this means the break-up of reinforcing fibers embedded in the resin matrix can be designed to be minimum or pull out of the fibers from the matrix can be minimal.

The procedure described below is for preparing 5-norbornene-2-carboxaldehyde which is subsequently reacted to produce 5-norbonene-2,2-dimethanol and the 5-norbornene-2,2-dimethanol is subsequently reacted with the diglycidyl ether of Bisphenol A to produce a spiro-epoxy which is curable with hexahydrophthalic acid.

PREPATATION OF 5-NORBORNENE-2-CARBOXALDEHYDE

The Diels-Alder reaction of cyclopentadiene and acrolein is carried out in the following manner: acrolein (14.4 Kg, 31.74 lbs., 257 moles) is transferred by syphoning under reduced pressure from the containers in which it is received into a 50-liter rector. The cyclopentadiene (17.9 Kg, 39.45 lbs, 136 moles) is prepared in a second reactor (by pyrolysis of the cyclopentadiene dimer), and distilled directly into the first rector which contains the acrolein. The rate of introduction of the cyclopentadiene is controlled so that the temperature of the receiving reactor remains below 35° C. The resulting product is purified by distillation (b.p. 68°-69° C. @ 9 mm.) (Yield of the 5-norbornene-2-carboxaldehyde is 25.8 Kg, 56.86 lbs).

PREPARATION OF 5-NORBORNENE-2,2-DIMETHANOL

5-Norbornene-2-carboxaldehyde (8.7 Kg, 19.18 lbs) and methanol (6 Kg, 13.2 lbs) are stirred vigorously in the reactor while 37% formaldehyde (14.4 Kg, 31.96 lbs) is added as rapidly as possible. Sodium hydroxide (2.9 Kg, 6.39 lbs), dissolved in water (5.2 liters), is added over a period of 2.5 hours. The temperature of the mixture ranges from 30° C. at the start of the addition to 85° C. at the completion of the addition. The resulting mixture is stirred an additional 2 hours, and then drowned with water (6 liters). The solid product is separated by filtration, and washed thoroughly with water.

A water-wet aliquot of the 5-norbornene-2,2-dimethanol (6.1 Kg, 13.4 lbs) is heated with toluene (3.5 gal, 13.25 liters) until a two-liquid phase has separated. The lower aqueous phase is separated (2.0 Kg, 4.41 lbs). The water, dissolved in the toluene solution, is removed by axeotropic distillation. The toluene solution is dried using desiccant. The yield of 5-norbornene-2,2-dimethanol amounts to 3.65 Kg (8.05 lbs, 23.7 moles).

PREPARATION OF THE COMONOMER OF 5-NORBORNENE-2,2-DIMETHANOL AND THE DIGLYCIDYL ETHER OF BISPHENOL A

Diglycidyl ether of Bisphenol A (8.0 lbs, 36.6 Kg) is added to the toluene solution of 5-norbornene-2,2-dimethanol. This is followed by the addition of dibutylstannic oxide (0.06 Kg, 0.13 lbs, 0.24 moles), and the water, which is formed as a result of this addition, is removed azeotropically. The clear solution is allowed to cool to 84° C., and carbon disulfide (0.018 Kg, 0.014 lbs) is added. The solution is then heated, under reflux, for 5-6 hours, and then allowed to cool. The solid which separated is removed by filtration, washed by slurrying with toluene, and again filtered. It is washed while on the filter with toluene. Yield 0.05 Kg (88% yield), m.p. 70°-80° C.

The method of manufacture of diglycidyl ether of Bisphenol A is presented in Table III along with the ingredients, quantitites of ingredients, and the order of addition of ingredients to reactor.

Table IV provides the specific instructions for manufacturing the diglycidyl ether of Bisphenol A.

TABLE III

METHOD OF MANUFACTURE OF DIGLYCIDYL ETHER OF BISPHENOL A

| INGREDIENT | QUANTITY CHARGED TO REACTOR (LBS) | (KG) | ORDER OF ADDITION TO REACTOR |
|---|---|---|---|
| Bisphenol A | 91.2 | 45.06 | I |
| Sodium hydroxide (flake) | 18.5 | 8.39 | II |
| Water | 110.0 | 49.9 | III |
| Formic acid (40%) | 28.1 | 12.75 | IV |
| Sodium-hydroxide (flake) | 17.3 | 7.85 | V |
| Water | 69.2 | 31.40 | VI |
| Xylene | 30.0 | 13.61 | VII |
| Epichlorohydrin | 71.5 | 32.44 | VIII |
| Sodium metasulfite | 1.0 | 0.454 | IX |
| Water | 3.0 | 1.36 | X |
| Sulfuric acid (Electrolytic)(30%) | 14.0 | 6.35 | XI |
| Oxalic acid | (As Needed) | | XII |
| Wash water | 400.00 | 181.49 | XIII |
| Input | 854.3 | 387.6 | |
| Yield | 128.9 | 58.49 | |

TABLE IV

MANUFACTURING INSTRUCTIONS FOR DIGLYCIDYL ETHER OF BISPHENOL A

| TIME | TEMPERATURE °F./°C. | INSTRUCTION |
|---|---|---|
| 0:00 | | Dissolve II in III; Add I; Gain 150° F.; |
| 0:30 | 150° F./66° C. | Add IV in 30 min at 150°-152°; |
| 1:00 | 152° F./67° C, | Hold 1 hour at 150°-160° F.; |
| 2:00 | 160° F./71° C. | Add V, VI, VII; |
| 2:10 | 156° F./69° C. | Regain 160° in 20 min; |
| 2:30 | 160° F./71° C. | Add VIII in 30-40 min at 175° F. max.; |
| 3:00 | 175° F./79° C. | Gain 180° F. in 30 min.; |
| 3:30 | 180° F./82° C. | Hold 3 hours; Add IX dissolved in X; Add XI until SO₂ odor is detected; |
| 7:00 | | Separate; |
| 8.00 | 180° F./82° C. | Wash with water-containing oxalic acid to pH = 6 |
| 9:00 | | Repeat wash 3 times until no Cl— is detected in wash water; |
| 13:00 | 180° F./82° C. | Distill off water; Allow temperature to rise to 220° F. |
| 15:00 | 220° F./104° C. | Remove solvent; Gain 300° F.; |
| 16:00 | 300°/149° C. | Steam distill off 200 lbs. water; |
| 17:00 | 300°/149° C. | Blow with CO₂ for 1 min; |
| 17:05 | 300°/149° C. | Dump. |

REACTANT COMPONENTS AND CURING CONDITIONS FOR PRODUCING MATRIX RESIN WITH CONTROLLED SHRINKAGE

The non-shrinking, dimensionally-stable modified epoxy resin comprises the reaction product of an amount of a diglycidyl ether of Bisphenol A and an amount of a compound selected from 6-hexanolactone and 5-norbornene-2, 2-dimethanol to yeild about 100 parts of a first component. This first component in an amount of about 100 parts by weight is blended with about 40 parts by weight of a second component which is hexahydrophthalic acid. The blend of the first component and the second component are reacted together at about 150° C. for about 2 hours to yield the non-shrinkage, dimensionally-stable modified epoxy resin. The reaction product, which is the non-shrinking, dimensionally-stable modified epoxy resin, of about one part is blended with each additional one to two parts of the diglycidyl ether of Bisphenol A and subsequently cured at 375° F. for about 2½ hours to yield a matrix resin composition having a controlled shrinkage.

The findings illustrated hereinabove indicate the uniqueness of the combinations wherein an optimum amount of a lactone can be polymerized with the epoxy resin and does not necessarily need to be copolymerized with equimolar amounts of achieve the optimum shrink resistance particularly since, in accordance with the invention, the reaction product is subsequently cured with hexahydrophthalic acid. The modified-epoxy, hexahydrophthalic acid-cured, shrink-resistant composition can be varied in a ratio with an unmodified epoxy resin to achiever a controlled shrinkage. Thus, it is possible to produce a laminate which is tailored so that reinforcing fibers would not undergo breakage, or pull out of the matrix on being stressed. For example, during a lamination procedure the ratio of the modified-epoxy to epoxy can be varied to achieve the desired volume change as illustrated in Table II.

Because of the above described means to achieve a controlled shrinkage, the non-shrinking, dimensionally-stable modified epoxy resin finds application in laminated structure wherein the stress loading may be higher in certain areas. In this situation, the amount of shrinkage and hence expansion can be controlled to prevent reinforcing fibers from undergoing breakage, or pulling out of the matrix resin. The modified epoxy resin has compatibility with fibers of glass, graphite, and poly-p-ethylene terephthalamide. The graphite As-4 or 4560 Kevlar as employed in U.S. Pat. No. 4,515,912 have been tested for use in interceptor motor cases wherein high burst strength pressures are required.

I claim:

1. A non-shrinking, dimensionally-stable modified epoxy resin produced by combining and reacting the first component and the second component as defined under (A) (i) and (A) (ii) hereinbelow and an unmodified epoxy resin combined with said non-shrinking, dimensionally-stable modified epoxy resin and further reacted as defined under (B) hereinbelow to produce a matrix resin composition having controlled shrinkage and comporising:

(A) (i) the reaction product of an amount of a diglycidyl ether of Bisphenol A with an amount of a compound selected from 6-hexanolactone and 5-norbornene-2,2-dimethanol to produce a reaction product as a first component, said first component being utilized in an amount of about 100 parts by weight with a second component;

(A) (ii) said second component being a curing agent of hexahydrophthalic acid which is blended with said first component in an amount of about 40 parts by weight; said first and said second component reacted together at about 150° C. for about 2 hours to yield said non-shrinking, dimensionally-stable modified epoxy resin having a volume change on polymerization of not more than 0.03 percent which is blended with a third component which is the unmodified epoxy resin diglycidyl ether of Bisphenol A; and, (B) said third component consisting of an additional amount from about 1 to 2 parts of said unmodified epoxy resin of diglycidyl ether of Bisphenol A which is blended with each part of said non-shrinking, dimensionally-stable modified epoxy resin and subsequently further cured at 375° F. for about 2½ hours to yield a matrix resin composition having a controlled shrinkage of about 1.4 to about 2.4 volume percent.

2. The non-shrinking, dimensionally-stable modified epoxy resin and matrix resin composition containing the same as defined in claim 1 and additionally in combination therewith a high strength fiber material selected from the group consisting of fibers of glass, graphite, and poly-p-ethylene terephtalamides.

* * * * *